United States Patent

[11] 3,586,427

| [72] | Inventors | Tokusaburo Kakiuchi;<br>Ando Akira, both of Tokyo, Japan |
|---|---|---|
| [21] | Appl. No. | 842,911 |
| [22] | Filed | July 18, 1969 |
| [45] | Patented | June 22, 1971 |
| [73] | Assignee | Kabushiki Kaisha Ricoh<br>Ota-ku, Tokyo, Japan |
| [32] | Priority | July 18, 1968 |
| [33] | | Japan |
| [31] | | 43/50779 |

[54] MOVABLE REFLECTING MIRROR DRIVE DEVICE FOR CARTRIDGE-TYPE CINEPROJECTORS
3 Claims, 3 Drawing Figs.

[52] U.S. Cl. ............................................................ 352/72
[51] Int. Cl. ....................................................... G03b 23/02
[50] Field of Search ........................................... 352/72, 78

[56] References Cited
UNITED STATES PATENTS

| 3,244,470 | 4/1966 | Hennessey et al. | 352/72 X |
| 3,300,270 | 1/1967 | Finnerty | 352/72 X |

Primary Examiner—Louis R. Prince
Assistant Examiner—Joseph W. Roskos
Attorney—Burgess, Ryan & Hicks ABSTRACT: A movable reflecting mirror drive device for cartridge-type cineprojectors wherein a movable reflecting mirror frame which is moved into and away from a path of insertion of a cartridge is drivingly interconnected to a blade-shaped rod. Upon insertion of the cartridge, its projection drives the rod so as to retract it together with the frame from the path. Upon removal of the cartridge, the projection rotates the frame and then the rod after disengagement from the frame so as to retract the frame from the path.

INVENTORS
TOKUSABURO KAKIUCHI
AKIRA ANDO
BY Burgess, Ryan & Hicks
ATTORNEYS 3,586,427

MOVABLE REFLECTING MIRROR DRIVE DEVICE FOR CARTRIDGE-TYPE CINEPROJECTORS

BACKGROUND OF THE INVENTION

The present invention relates to a cartridge-type small-sized cineprojector and more particularly to a movable reflecting mirror drive device of the type moving into and away from a cartridge a movable reflecting mirror for reflecting the projection light in response to insertion or removal of the cartridge.

In the cartridge-type small-sized cineprojector, the light from a light source must be reflected before it illuminates the film so that a reflecting mirror must be moved into the cartridge in case of projection. When the cartridge is removed from the projector, the reflecting mirror must be retracted from a path of insertion of the cartridge in the projector.

Various means for this purpose have been proposed, but they have not been successful in view of their complicated construction and expensive cost.

One of the objects of the present invention is therefore to provide a movable reflecting mirror drive device for a cartridge-type small-sized cineprojector, compact in size and reliable in operation.

Another object of the present invention is to provide a movable reflecting mirror drive device of the type described inexpensive to manufacture.

SUMMARY OF THE INVENTION

According to the present invention, a movable reflecting mirror supporting frame which is moved into and away from the path of insertion of a cartridge within the projector is drivingly interconnected with a rod having a blade-shaped or segmental member formed integral therewith (to be referred to as "blade-shaped rod" hereinafter). Upon insertion of a cartridge, its projection drives the blade-shaped rod so as to retract it together with its drivingly interconnected reflecting mirror supporting frame from the path of insertion of the cartridge. Upon removal of the cartridge from the projector, said projection contacts the movable reflecting mirror frame first and then engages with the cam portion of the blade-shaped rod after disengagement from the mirror frame, thereby retracting the blade-shaped rod together with the mirror frame from the path of cartridge insertion. Both of the blade-shaped rod and the mirror frame are returned to their normal positions after insertion and removal of the cartridge.

The above and other objects, features and advantages of the present invention will become more apparent from the following description of one illustrative embodiment thereof with reference to the accompanying drawing.

DESCRIPTION OF THE PREFERRED EMBODIMENT

Figure 1:
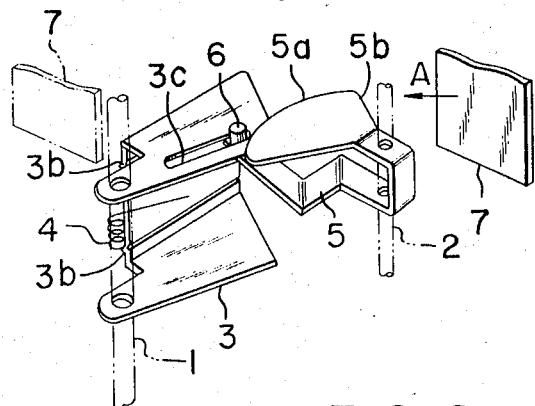
FIG. 1 is a perspective view of one embodiment of the present invention illustrating the state prior to the insertion of a cartridge.

Stationary shafts 1 and 2 are securely fixed to a machine for of a projector in parallel relation with each other. A movable reflecting mirror frame 3 is rotatably carried by the shaft 1 and its free end is normally pressed against the inner wall of the projector by means of a spring 4 loaded between the shaft 1 and the frame 3 so that the frame 3 may be held in position substantially at 45° relative to a film travel path. Ridges 3b are extended from the regions outside of a reflecting surface 3a of the frame 3 and an elongated slot 3c is formed through the upper arm of the frame 3.

A blade-shaped or segment rod 5 is rotatably carried by the stationary shaft 2 and has a cam region 5a and a rectilinear region 5b formed in the upper arm thereof. A pin 6 extending from the free end of the lower arm of the rod 5 is fitted into the elongated slot 3c so that the blade-shaped rod 5 may be operatively connected with the movable reflecting mirror frame 3.

Figure 2:
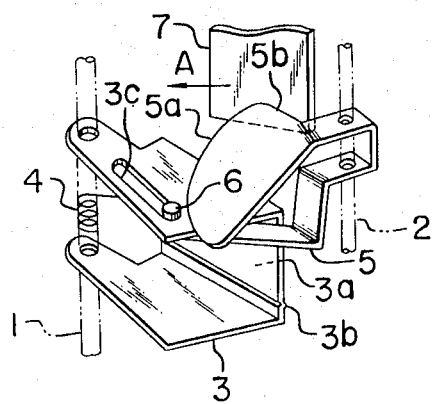
FIG. 2 is a view similar to FIG. 1 except that it illustrates the state when a cartridge is being inserted.
Figure 3:
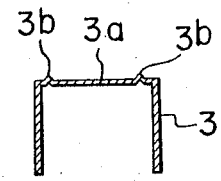
FIG. 3 is a transverse sectional view of a movable reflecting mirror frame.

When a cartridge is inserted in the direction indicated by the arrow A in FIG. 1, a projection 7 extending from the outer casing of the cartridge abuts against the rectilinear region 5b of the blade-shaped rod 5 so as to rotate it in the counterclockwise direction as shown in FIG. 2, whereby the frame 3 which is operatively interconnected with the rod 5 is rotated in the clockwise direction against the force of the spring 4. Thus, both the rod 5 and the frame 3 are retracted from the path of the projection 7. Upon insertion of the cartridge to full extent, the projection 7 reaches the position indicated by the two-dot chain line shown in FIG. 1. Then, the frame 3 together with the rod 5 is returned to its initial position by the spring 4 and the reflecting mirror frame 3 is advanced into the recess (not shown, but formed backwardly of the projection) of the cartridge so as to place the reflecting mirror 3a at 45° relative to the film surface so that the light from the light source may be reflected by the reflecting surface and projected upon a screen.

When the cartridge is removed out of the projector, the projection 7 slides along the ridges 3b without contact with the reflecting surface 3a so that the reflecting mirror frame 3 is rotated in the clockwise direction against the spring 4 while the blade-shaped rod 5 which is drivingly interconnected with the frame 3 is rotated in the counterclockwise direction. The projection 7 of the cartridge separates from the frame 3 and then contacts the cam portion 5a of the blade-shaped rod 5 so as to rotate it further in the counterclockwise direction. Therefore, the movable reflecting mirror frame 3 is also caused to rotate further in the clockwise direction so that the frame 3 and the rod 5 may be completely retracted away from the path of the cartridge. When the cartridge is completely removed out of the projector, the reflecting mirror frame 3 and the blade-shaped rod 5 may be returned to their initial positions by means of the spring 4.

From the foregoing, it will be seen that the movable reflecting mirror frame may be automatically retracted from the projection optical path in response to the insertion or removal of the cartridge and then returned into the projection optical path automatically upon completion of the insertion or removal. As compared with the conventional device which is operated manually, the device of the present invention may be operated in a very simple and reliable manner and may be made compact in size.

We claim:

1. A movable reflecting mirror drive device for a film cartridge type cineprojector comprising:

a reflecting mirror frame formed in a U-shaped with a reflecting mirror surface located on an outside surface of the bight of the U which has flat-shaped legs extending therefrom, a portion of at least one of said legs being pivotally mounted in the cineprojector so that said frame is rotatable therein, and a slot being formed in one of said legs;

a rod element pivotally mounted in the cineprojector and having a bifurcated shape, one portion thereof having a cam region and a connected rectilinear region and another juxtaposed portion thereof extending outwardly from the pivot mounting to terminate in a pin element that slidably fits within said slot;

a spring mounted in the cineprojector and biasing said frame into operative position whereby said mirror reflects light toward the film;

said rod element and said frame being simultaneously rotated counterclockwise and clockwise respectively when a cartridge being inserted contacts said rectilinear region, and said rod element and said frame being returned to the operative position by the spring bias when the cartridge has been fully inserted into the cineprojector; and said rod element and said frame being simultaneously rotated counterclockwise and clockwise respectively when a cartridge being removed from the cineprojector contacts said bight of said frame and further contacts said cam region, and said rod element and said frame being returned to the operative position by the spring bias when the cartridge has been completely removed from the cineprojector 2. A movable reflecting mirror drive device according to claim 1, in which at least one ridge is formed in the surface of said reflecting mirror, said ridge being contacted by the cartridge during removal.

3. A movable reflecting mirror drive device according to claim 1, in which the pivot mountings of said frame and said rod element comprise parallel shafts secured in the cineprojector, a first pair of aligned opening are formed respectively in the legs of said frame, and one of said shafts is located to pass through said first pair of openings; a second pair of openings are formed in the juxtaposed portions of said rod element, and the other shaft is located to pass through said second pair of openings; and said spring is mounted on said one shaft.